(12) United States Patent
Tenca et al.

(10) Patent No.: US 7,193,347 B2
(45) Date of Patent: Mar. 20, 2007

(54) MOTOR-SENSOR SYSTEM

(75) Inventors: Vittorio Tenca, Caprino Veronese (IT);
Ernesto Zanotti, Giovanni Lupatoto (IT); Andrea Bari, Verona (IT); Carradori Corrado, Pescantina (IT)

(73) Assignee: PWB-Ruhlatec Industrieprodukte GmbH, Seebach (DE)

( * ) Notice: Subject to any disclaimer, the term of this patent is extended or adjusted under 35 U.S.C. 154(b) by 0 days.

(21) Appl. No.: 10/278,121

(22) Filed: Oct. 22, 2002

(65) Prior Publication Data
US 2005/0179328 A1 Aug. 18, 2005

(30) Foreign Application Priority Data
Dec. 24, 2001 (DE) ................. 101 64 078

(51) Int. Cl.
*H02K 5/00* (2006.01)
(52) U.S. Cl. ..................... 310/91; 310/68 B
(58) Field of Classification Search ........... 310/68 B, 310/91
See application file for complete search history.

(56) References Cited
U.S. PATENT DOCUMENTS 5,155,401 A 10/1992 Kanaya et al.
6,249,068 B1* 6/2001 Knopp ............... 310/71
6,534,888 B1* 3/2003 Vorberg et al. ........ 310/91

FOREIGN PATENT DOCUMENTS

JP 59063950 * 4/1984

* cited by examiner

*Primary Examiner*—Darren Schuberg
*Assistant Examiner*—Nguyen N Hanh
(74) *Attorney, Agent, or Firm*—Norris McLaughlin & Marcus, PA

(57) ABSTRACT

A motor-sensor system of an electric motor with a shaft end on an encoder side, a mounting device for the motor, terminals for supplying power to the motor and a printed circuit board with electronic components for controlling and regulating an encoder unit. Contact pins are provided for supplying power to the motor and for forming contact guides with correspondingly formed bore holes disposed in the motor are positioned on a solid printed circuit board. An angular mounting clamp encompasses the electric motor on the shaft end of the encoder side. The clamp ends are formed as pegs which secure the end face and at least one longitudinal side of the motor on the printed circuit board. The angular mounting clamp has in the plane of the end face of the motor a contact surface for the shaft end of the encoder side of the electric motor.

6 Claims, 2 Drawing Sheets

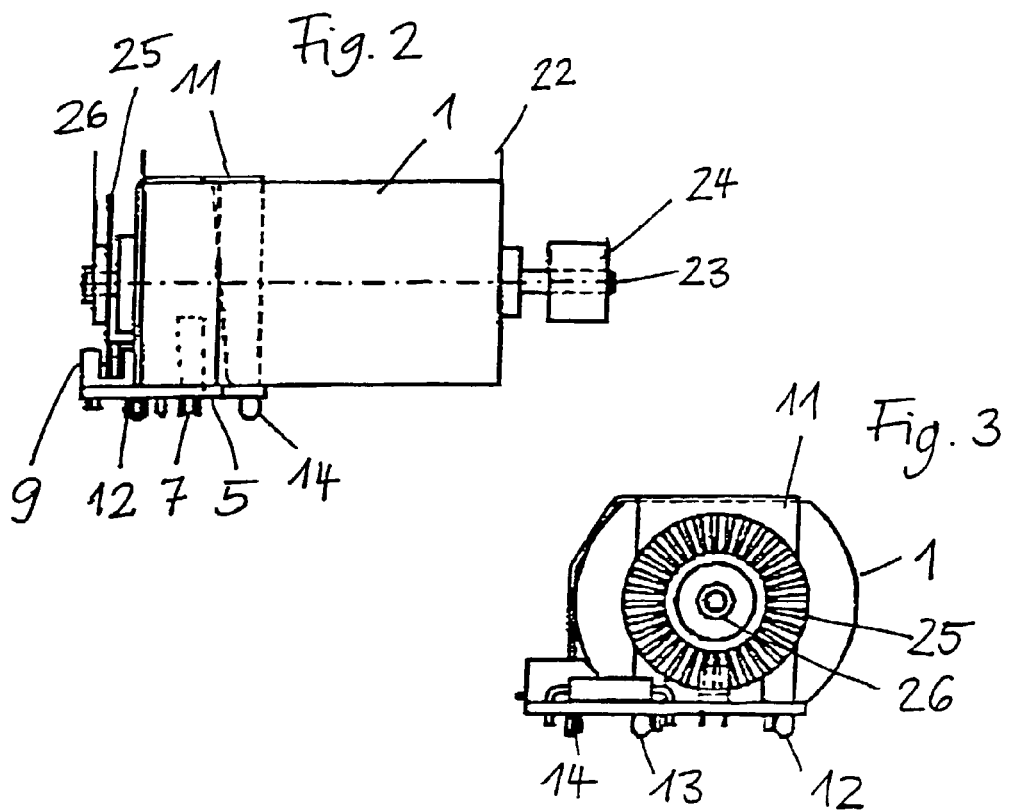
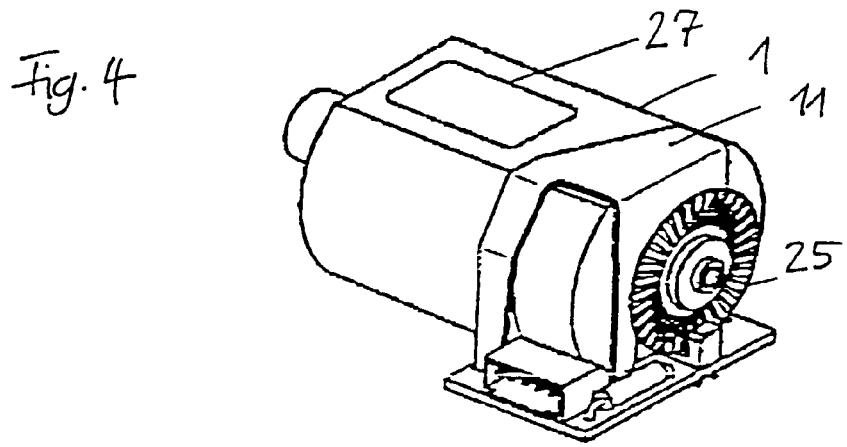

MOTOR-SENSOR SYSTEM

BACKGROUND OF THE INVENTION

The invention relates to motor-sensor system, which includes an electric motor including a shaft end disposed on an encoder side, a mounting device for the motor, terminals for supplying power to the motor, and a printed circuit board with electronic components for controlling and regulating an encoder unit.

Encoder systems have to meet strict reliability standards for positioning accuracy and resolution under varying temperature conditions. Since encoder systems are components manufactured in volume, they have to be designed for high-volume manufacturing and reliable operation, which can be best achieved with a simple design with a low parts count.

SUMMARY OF THE INVENTION

One aspect of the invention relates to satisfying the above mentioned requirements with a motor-sensor system constructed of two prefabricated components that are assembled with a novel mounting device.

The two components include an electric motor with a shaft end disposed on an encoder side and a printed circuit board with electronic components. Precisely dimensioned bore connections adapted to receive contact pins are formed in the motor component. The contact pins are secured to the printed circuit board at exact locations. The assembly consisting of the motor/printed circuit board is secured in a first position in the x-y-plane of the components by pushing the contact pins into the bore connections of the motor.

Also arranged on the printed circuit board is a sensor-emitter unit which is aligned exactly in relation to the shaft end on the encoder side when the contact pins are pushed in. A timing disk is later placed on the shaft end. Thereafter, an angular mounting clamp can be pushed from the top over the motor in the z-plane, with the ends of the mounting plate being inserted into suitably arranged slots on the printed circuit board which is connected from below. The clamp has a particular shape (three-sided formfitting connection) so that both the end face as well as a longitudinal side of the electric motor can be used as a guide surface. The top side of the motor and the base (bottom side) of the motor are connected for force transmission by mechanically and/or thermally machining/deforming the ends of the projections relative to the slots in the printed circuit board. A radial recess on the end face of the mounting clamp improves the positioning accuracy and enables it to be centered in the front plane (x, y, and z-plane).

Other aspects of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

In the drawings, wherein like reference numerals delineate similar elements throughout the several views:

FIG. 2 illustrates the side view of the motor-sensor system according to the invention after assembly;

FIG. 3 illustrates a front view of the motor-sensor assembly of the invention; and FIG. 4 illustrates a perspective view of the motor-sensor system of the invention.

DETAILED DESCRIPTION OF THE PRESENTLY PREFERRED EMBODIMENTS

Figure 1:
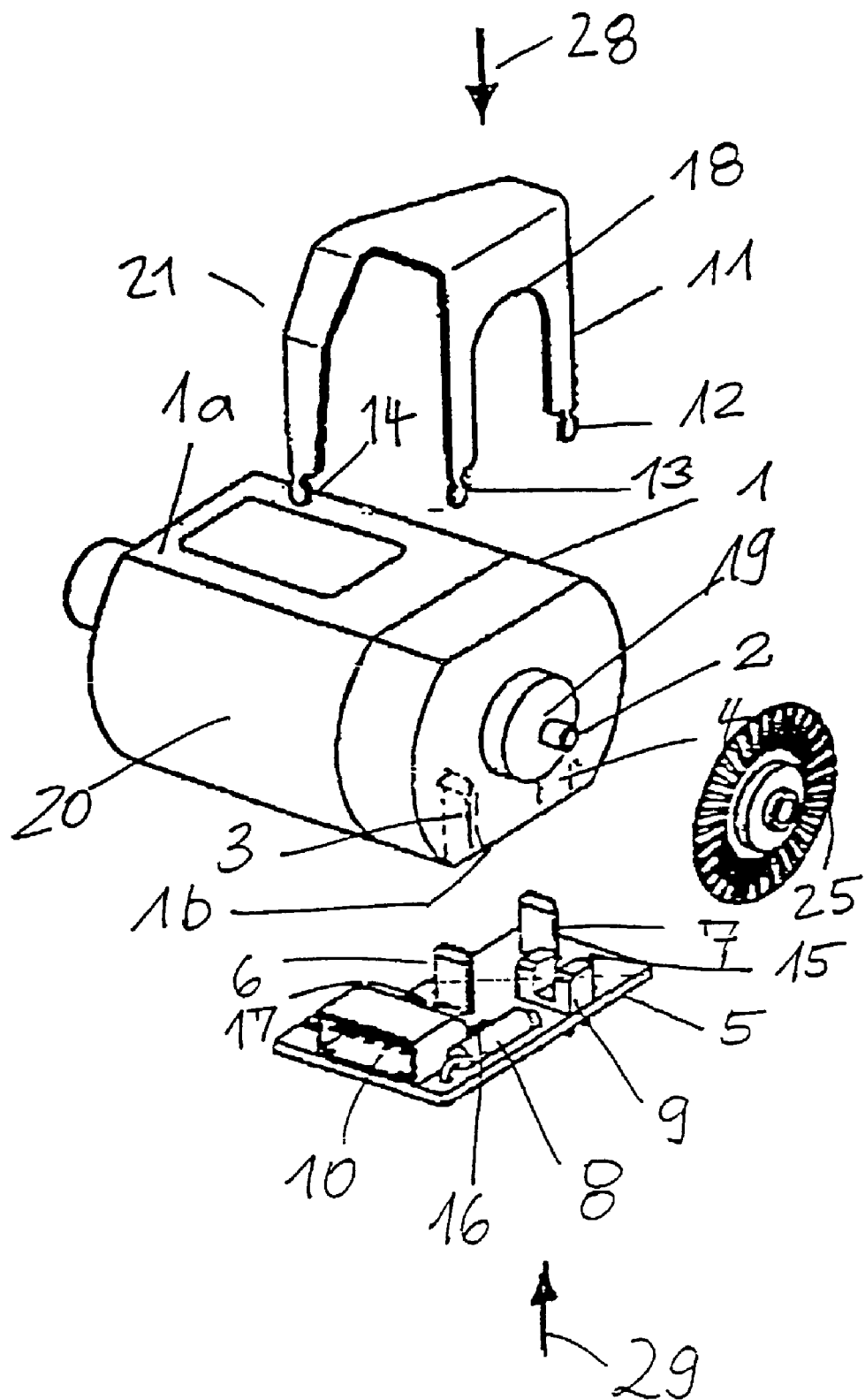
FIG. 1 illustrates the motor-sensor system according to the invention before assembly.

FIG. 1 shows a motor 1 with a shaft end 2 disposed on an encoder side, wherein the motor 1 is in the form of a cylindrical component with flat top and bottom sides 1a, 1b. Two bore holes 3, 4 are disposed in the flat side 1b of the motor housing to enable connection to the printed circuit board 5.

In addition to the two contact pins 6, 7 adapted for insertion into the bore holes 3, 4, the printed circuit board 5 includes electronic components, such as a resistor 8, a sensor-emitter unit 9 and a plug connector 10. Additional elements, such as the conductor tracks, are disposed on the backside of the printed circuit board (not shown).

After the contact pins have been inserted into the bore holes, the mounting device 11 in the form of a clamp is pushed onto the motor 1 from above—i.e., from the side of the motor 1a opposite the printed circuit board 5—in the direction of the arrow 28 and assembled by pushing the peg ends 12, 13, 14 into corresponding guide slots 15, 16, 17 formed on the printed circuit board 5. The connection attains its mechanical rigidity mechanically by twisting or bending the peg ends 12, 13, and 14 and/or thermally by soldering, which can be performed in a single processing step.

The sensor-emitter unit 9 is automatically centered with respect to the shaft end 2 by a recess 18 in the form of a semicircle. A cylindrical flange 19 on the shaft end 2 forms a contact surface for insertion and a pass-fit with the recess 18. Another contact surface is a side surface 20 of the electric motor 1, which is encompassed by an angled end 21 of the clamp-shaped mounting device 11.

FIGS. 2, 3 and 4 show three different perspective views of the motor-sensor system of the invention in an assembled state. FIG. 2 is a side view of the motor 1 with the clamp-shaped mounting device 11, indicating also a gear side 22 with shaft and pinion 23, 24 that provides a mechanical connection to additional control units of the encoder system.

The printed circuit board 5 with a sensor-emitter unit 9 as well as a lower end of the contact pin 7 and the peg ends 12, 14 of the mounting device 11 is disposed on the underside of the motor 1. Also shown is a side view of a timing disk 25 with a timing disk hub 26.

FIG. 3 shows a front view of the motor 1 with the timing disk and the timing disk hub 25. Also shown are the front face of the mounting device 11 with the front peg ends 12, 13 and—somewhat obscured—the rear peg end 14.

The descriptions above illustrate a space-saving construction of the mounting device 11, which particularly reduces the weight. As a result, the top side of the motor 1 can accommodate additional surfaces 27, for example, for applying labels. The perspective view of FIG. 4 shows that the motor-sensor system according to the invention is composed of three components, namely the motor 1, the mounting device 11 and the printed circuit board 5, which are assembled in only one preferred direction as indicated in FIG. 1 by the arrows 28, 29. All guide surfaces are self-centering which obviates the need for additional accessories for assembly. Later readjustments also become unnecessary, because the prefabricated components can be checked individually optically before assembly.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A motor-sensor system, comprising an electric motor including a shaft end on an encoder side, a mounting device for the motor, terminals for supplying power to the motor and a circuit board with electronic components for controlling and regulating an encoder unit, wherein
   at least two contact puts for supplying power to the motor and for forming contact guides with correspondingly formed bore holes disposed in the motor are positioned on a solid printed circuit board;
   an angular mounting clamp encompasses the electric motor on the shaft end of the encoder side, wherein the angular mounting clamp terminates in formed pegs which when assembled extend through respective slots defined in the printed circuit board so as to secure an end face and at least one longitudinal side of the motor on the printed circuit board, and wherein the angular mounting clamp has in the plane of the end face of the motor a contact surface for the shaft end of the encoder side of the electric motor, and wherein alignment of the shaft end on the encoder side of the motor with a sensor-emitter is ensured by the angular mounting clamp having a three-sided form-fitting shape so that the end face and the longitudinal side of the motor is used as guide surfaces as well as by the arrangement of the pegs into corresponding slots defined in the circuit board.

2. The motor-sensor system according to claim 1, wherein the electric motor has at least one flat base for providing a connection to the printed circuit board, and the angular mounting clamp encompassing the motor is connected with the printed circuit board.

3. The motor-sensor system according to claim 1, wherein the angular mounting clamp together with the printed circuit board represents an open housing that encompasses the electric motor on at least four sides.

4. The motor-sensor system according to claim 1, wherein the four sides of the open housing are formed by an end face, which contacts the shaft end of the encoder side of the electric motor, and three mutually connected contact surfaces for the top face, bottom face and side face of the electric motor.

5. The motor-sensor system according to claim 1, wherein the contact surface between the angular mounting clamp and the end face is formed as a circle or a segment of a circle.

6. An assembly for centering a sensor-emitter-unit of a motor-sensor system, comprising an electric motor having a shaft end directed to an encoder side, and two contact apertures;
   a mounting device positions above the motor;
   a circuit board including the sensor-emitter unit and electronic components for controlling and regulating an encoder unit and two contact pins fitted to be accepted by the two contact apertures terminals in the motor for providing power to the motor, and at least two guide slots;
   the mounting device being form-fitted around the electric motor and including at least two pegs with bendable ends; the bendable ends extend through the at least two guide slots defined in the circuit board such that upon bending the ends, the motor is held in place by the mounting device; wherein alignment of the shaft end on the encoder side of the motor with a sensor-emitter is ensured by the mounting device having a three-sided form-fitting shape so that an end face and a longitudinal side of the motor is used as guide surfaces as well as by the arrangement of the pegs into the corresponding guide slots defined in the circuit board.

* * * * *

UNITED STATES PATENT AND TRADEMARK OFFICE
CERTIFICATE OF CORRECTION

| | | |
|---|---|---|
| PATENT NO. | : 7,193,347 B2 | Page 1 of 1 |
| APPLICATION NO. | : 10/278121 | |
| DATED | : March 20, 2007 | |
| INVENTOR(S) | : Tenca et al. | |

It is certified that error appears in the above-identified patent and that said Letters Patent is hereby corrected as shown below:

Column 3, Line 24, "two contact puts" should read -- two contact pins --

Signed and Sealed this

Sixth Day of November, 2007

JON W. DUDAS
*Director of the United States Patent and Trademark Office*